(12) United States Patent
Thirumalai Ananthan Pillai et al.

(10) Patent No.: US 11,476,707 B2
(45) Date of Patent: Oct. 18, 2022

(54) WIRELESS POWER SYSTEM HOUSING

(71) Applicant: Apple Inc., Cupertino, CA (US)

(72) Inventors: Srinivasa V. Thirumalai Ananthan Pillai, San Jose, CA (US); Paul J. Hack, San Jose, CA (US); Timothy J. Rasmussen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/108,923

(22) Filed: Dec. 1, 2020

(65) Prior Publication Data

US 2022/0109328 A1    Apr. 7, 2022

Related U.S. Application Data

(60) Provisional application No. 63/088,234, filed on Oct. 6, 2020.

(51) Int. Cl.
*H02J 5/00* (2016.01)
*H02J 50/00* (2016.01)
*H02J 50/10* (2016.01)

(52) U.S. Cl.
CPC ............ *H02J 50/005* (2020.01); *H02J 50/10* (2016.02)

(58) Field of Classification Search
CPC .... H01F 38/10; H01F 2038/143; H02J 17/00; H04B 3/56; H04B 2203/5483
USPC ........................................................ 307/149
See application file for complete search history.

(56) References Cited

U.S. PATENT DOCUMENTS

| | | | |
|---|---|---|---|
| 6,370,656 B1 | 4/2002 | Olarig et al. | |
| 6,781,481 B2 | 8/2004 | Richardson | |
| 7,435,126 B1 | 10/2008 | Larkin | |
| 7,869,221 B2 | 1/2011 | Knight et al. | |
| 7,937,596 B2 | 5/2011 | Mackey et al. | |
| 8,235,757 B2 | 8/2012 | Brear | |
| 8,337,250 B1* | 12/2012 | Yang | H01R 13/112 439/620.22 |
| 8,575,491 B2 | 11/2013 | Gundel et al. | |
| 8,674,226 B2 | 3/2014 | Horan et al. | |
| 8,746,987 B2 | 6/2014 | Choi | |
| 8,934,261 B2* | 1/2015 | Lin | H05K 1/141 361/792 |
| 8,962,388 B2 | 2/2015 | Nagar et al. | |
| 8,975,523 B2* | 3/2015 | Silva | H01F 3/10 174/128.2 |
| 9,209,570 B2 | 12/2015 | Toba et al. | |
| 9,590,339 B2 | 3/2017 | Oberski et al. | |
| 9,596,756 B2 | 3/2017 | Rainer et al. | |
| 9,784,927 B2 | 10/2017 | Lambourn et al. | |
| 9,874,414 B1 | 1/2018 | Ong | |
| 10,068,878 B2 | 9/2018 | Kim et al. | |

(Continued)

FOREIGN PATENT DOCUMENTS

CN       109217398 A    1/2019
EP          1988611 B1    8/2010

*Primary Examiner* — Quan Tra

(74) *Attorney, Agent, or Firm* — Treyz Law Group, P.C.; Jason Tsai

(57) ABSTRACT

A wireless power system has a wireless power transmitting device such as a charging puck and a wireless power receiving device such as a battery-operated device. The charging puck may be connected to a plug via a cable. The plug may include a boot and a connector. The boot may house a printed circuit board that is positioned closer to one of the boot housing walls.

17 Claims, 14 Drawing Sheets

(56) References Cited

U.S. PATENT DOCUMENTS

| | | | |
|---|---|---|---|
| 10,090,618 B2 | 10/2018 | Rohrbach et al. | |
| 10,282,339 B2 | 5/2019 | Woosley et al. | |
| 10,506,712 B1* | 12/2019 | Tsao | H05K 1/032 |
| 10,587,149 B2 | 3/2020 | Wikstrand | |
| 10,729,915 B2 | 8/2020 | Tomasello et al. | |
| 11,212,912 B1* | 12/2021 | Rodriguez | H05K 3/3436 |
| 2007/0164704 A1* | 7/2007 | McGinley | H01R 24/28 |
| | | | 320/114 |
| 2008/0123302 A1* | 5/2008 | Kawano | H05K 1/186 |
| | | | 361/728 |
| 2008/0169910 A1 | 7/2008 | Greene et al. | |
| 2009/0289596 A1* | 11/2009 | McGinley | H01R 31/065 |
| | | | 320/111 |
| 2012/0162947 A1* | 6/2012 | O'Donnell | H01L 25/16 |
| | | | 257/532 |
| 2012/0217290 A1* | 8/2012 | Lee | B23K 1/203 |
| | | | 228/224 |
| 2013/0094157 A1* | 4/2013 | Giuliano | H01L 28/90 |
| | | | 361/748 |
| 2013/0343022 A1* | 12/2013 | Hu | H01L 21/568 |
| | | | 361/761 |
| 2014/0131083 A1* | 5/2014 | Park | H05K 1/186 |
| | | | 29/841 |
| 2015/0103494 A1* | 4/2015 | Kim | H05K 3/24 |
| | | | 361/728 |
| 2016/0126752 A1* | 5/2016 | Vuori | H02J 5/005 |
| | | | 307/104 |
| 2017/0194808 A1* | 7/2017 | Pasternak | H02J 7/025 |
| 2018/0146543 A1* | 5/2018 | Chen | H05K 1/0219 |
| 2019/0257873 A1 | 8/2019 | Sholtis et al. | |
| 2019/0262524 A1 | 8/2019 | Wyeth et al. | |
| 2020/0076120 A1 | 3/2020 | Pepe et al. | |
| 2020/0228166 A1 | 7/2020 | Scherer et al. | |
| 2020/0328143 A1* | 10/2020 | Marinov | H01P 5/04 |

\* cited by examiner

WIRELESS POWER SYSTEM HOUSING

This application claims the benefit of provisional patent application No. 63/088,234, filed Oct. 6, 2020, which is hereby incorporated by reference herein in its entirety.

FIELD

This relates generally to power systems, and, more particularly, to wireless power systems for charging electronic devices.

BACKGROUND

In a wireless charging system, a wireless power transmitting device such as a charging mat or charging puck wirelessly transmits power to a wireless power receiving device such as a portable electronic device. The portable electronic device has a coil and rectifier circuitry. The coil of the portable electronic device receives alternating-current wireless power signals from the wireless power transmitting device. The rectifier circuitry converts the received signals into direct-current power.

SUMMARY

A wireless power system has a wireless power transmitting device and a wireless power receiving device. The wireless power receiving device may be a wristwatch having a magnetic core with at least first and second wireless power receiving coils. The wireless power transmitting device may be a charging puck connected to a plug such as a Universal Serial Bus plug via a cable.

In some embodiments, a wireless power transmitting device is provided that includes a device housing, at least one wireless power transmitting coil within the device housing, a cable having a first end connected to the device housing and having a second end, and a plug connected to the second end of the cable. The plug includes a boot with a boot housing having an upper wall and a lower wall, a connector extending from the boot, and a printed circuit board disposed within the boot housing, where the printed circuit board is positioned a first distance from the upper wall and a second distance, different than the first distance, from the lower wall. Taller passive components can be mounted on the side of the printed circuit board with more available spacing to the boot wall. Shorter active components can be mounted on the opposing side of the printed circuit board with less spacing to the boot wall. Underfill material may be disposed under the active components. The passive components can be free of any underfill material.

In some embodiments, a wireless power transmitting device is provided that includes a device housing, at least one wireless power transmitting coil within the device housing, a cable having a first end connected to the device housing and having a second end, and a plug connected to the second end of the cable. The plug includes a boot with a boot housing, a connector extending from the boot, a printed circuit board disposed within the boot housing, first electronic components arranged in a first area on the printed circuit board, second electronic components arranged in a second area on the printed circuit board, underfill material disposed under the first electronic components in the first area, and an underfill barrier configured to block the underfill material from reaching the second electronic components in the second area. The second electronic components can be low acoustic noise capacitors (sometimes referred to as reduced noise acoustic capacitors) that are coupled to a power rail of an inverter driving that wireless power transmitting coil. The underfill barrier may be a metal barrier structure.

In some embodiments, a wireless power transmitting device is provided that includes a device housing, at least one wireless power transmitting coil within the device housing, a plug, and a cable having a first end connected to the device housing and having a second end connected to the plug. The cable includes a differential signal path, a first single-ended signal line capacitively coupled to the differential signal path by a first amount, and a second single-ended signal line capacitively coupled to the differential signal path by a second amount equal to the first amount to reduce crosstalk between the first and second single-ended signal lines. The differential signal path includes a positive signal line coupled to the first single-ended signal line by the first amount and coupled to the second single-ended signal line by the second amount and includes a negative signal line coupled to the first single-ended signal line by the first amount and coupled to the second single-ended signal line by the second amount.

In some embodiments, a wireless power transmitting device is provided that includes a device housing that houses a wireless power transmitting coil, device control circuitry, and a temperature sensor configured to output a temperature value, a cable having a first end connected to the housing and having a second end, and a plug connected to the second end of the cable and having boot control circuitry, where the device control circuitry is configured to transmit heartbeat signals to the boot control circuitry via the cable and where the device control circuitry is configured to stop transmission of the heartbeat signals in response to detecting that the temperature value has exceeded a predetermined threshold. The boot control circuitry can stop providing power to the wireless power transmitting coil via the cable in response to detecting that the device control circuitry has stopped transmitting the heartbeat signals by latching off an electronic fuse within the boot housing.

DETAILED DESCRIPTION

A wireless power system includes a wireless power transmitting device such as a wireless charging puck. The wireless power transmitting device wirelessly transmits power to a wireless power receiving device such as a cellular telephone, wristwatch, or other electronic equipment. The wireless power receiving device uses power from the wireless power transmitting device for powering the device and for charging an internal battery.

Figure 1:
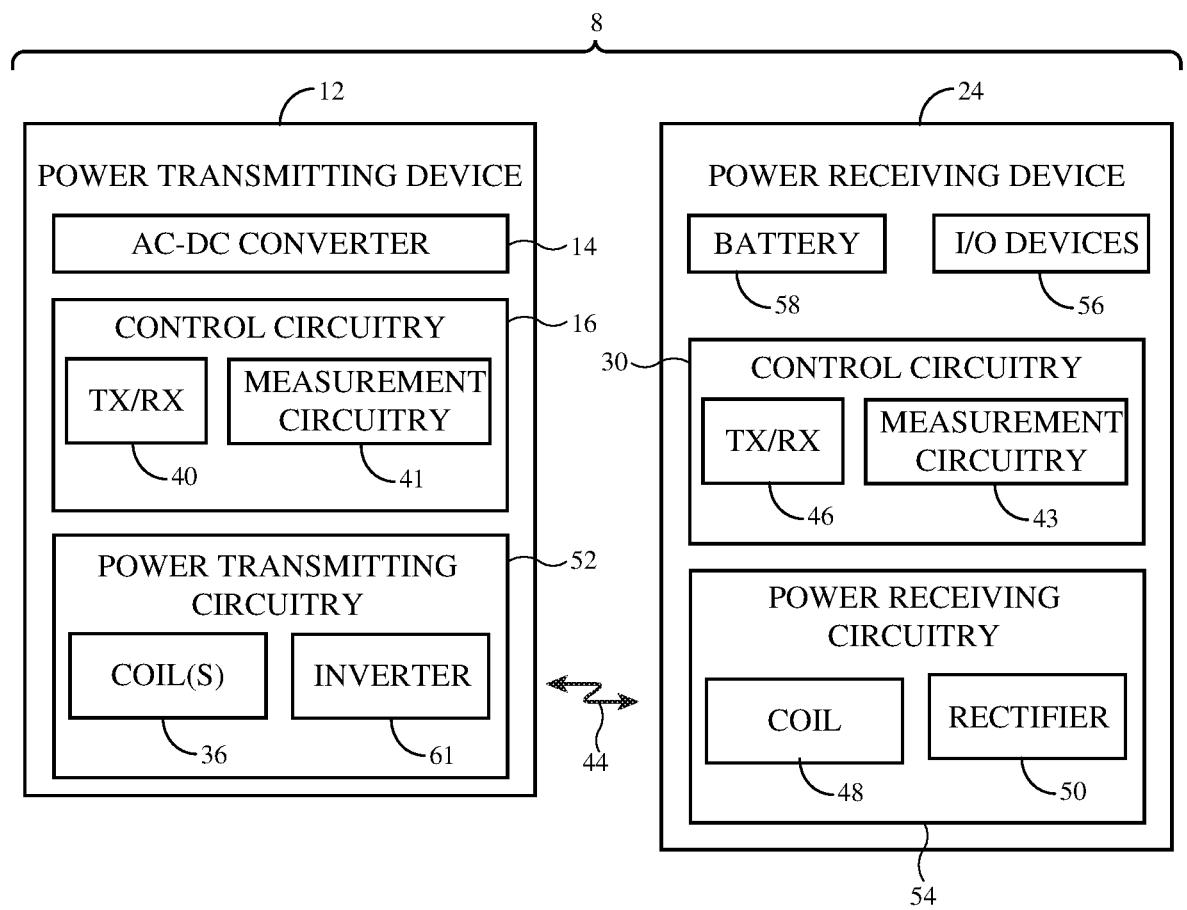
FIG. 1 is a schematic diagram of an illustrative wireless charging system that includes a wireless power transmitting device and a wireless power receiving device in accordance with some embodiments.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils (in embodiments with multiple coils), determining power transmission levels, processing sensor data and other data, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless power transmitting device that includes power adapter circuitry), may be a wireless charging puck or other device that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging puck having a cable with a plug that is adapted to mate with a device such as a power adapter or other electronic equipment with a USB connector port are sometimes described herein as an example.

Power receiving device 24 may be a portable electronic device such as a cellular telephone, wristwatch, or other electronic equipment. Power transmitting device 12 may be coupled to a wall outlet (e.g., an alternating current power source) and may use AC-DC converter to produce direct-current (DC) power and/or may have a battery for supplying power. In some embodiments, which are described herein as an example, AC-DC converter 14 is a stand-alone power converter or is incorporated into a laptop computer or other device with a connector port (e.g., a USB connector port). With this type of arrangement, device 12 is separate from the equipment that includes converter 14 and has a cable that plugs into the connector port to receive DC power from converter 14.

The DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from switches such as transistors) that is turned on and off based on control signals provided by control circuitry 16 to create AC current signals through one or more wireless power transmitting coils such as wireless power transmitting coils 36. As an example, coils 36 may be arranged in a planar coil array (e.g., in configurations in which device 12 is a wireless charging mat) or may be arranged to form a cluster of coils (e.g., in configurations in which device 12 is a wireless charging puck). As another example, device 12 may have only a single coil. As another example, device 12 may have multiple coils (e.g., two or more coils, four or more coils, six or more coils, 2-6 coils, fewer than 10 coils, etc.).

As the AC currents pass through one or more coils 36, the coils 36 produce electromagnetic field signals 44 in response to the AC current signals. Electromagnetic field signals (sometimes referred to as wireless power signals) 44 can then induce a corresponding AC current to flow in one or more nearby receiver coils such as coil 48 in power receiving device 24. When the alternating-current electromagnetic fields are received by coil 48, corresponding alternating-current currents are induced in coil 48. Rectifier circuitry such as rectifier circuitry 50, which contains rectifying components such as synchronous rectification metal-oxide-semiconductor transistors arranged in a bridge network, converts received AC signals (received alternating-current signals associated with electromagnetic field signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56 such as a display, touch sensor, communications circuits, audio components, sensors, light-emitting diode status indicators, other light-emitting and light detecting components, and other components and these components (which form a load for device 24) may be powered by the DC voltages produced by rectifier circuitry 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

It is desirable for power transmitting device 12 and power receiving device 24 to be able to communicate information such as received power, states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect external objects adjacent to device 12 (e.g., on the top of a charging mat or, if desired, to detect objects adjacent to the coupling surface of a charging puck). Circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coils 36 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator that can create impulses so that impulse responses can be measured to gather inductance information, Q-factor information, etc.) and signal detection circuitry (e.g., filters, analog-to-digital converters, impulse response measurement circuits, etc.). During measurement operations, switching circuitry in device 12 (e.g., in the puck of device 12) may be adjusted by control circuitry 16 to switch each of coils 36 into use. As each coil 36 is selectively switched into use, control circuitry 16 uses the signal generator circuitry of signal measurement circuitry 41 to apply a probe signal to that coil while using the signal detection circuitry of signal measurement circuitry 41 to measure a corresponding response. Measurement circuitry 43 in control circuitry 30 and/or in control circuitry 16 may also be used in making current and voltage measurements (e.g., so that this information can be used by device 24 and/or device 12).

Figure 2:
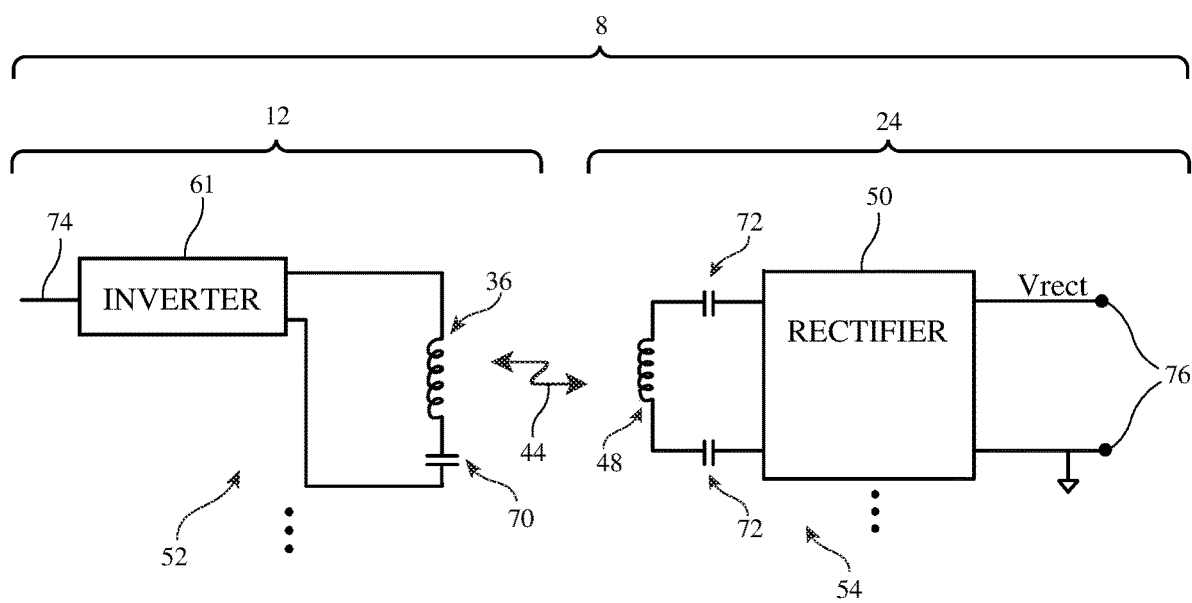
FIG. 2 is a circuit diagram of wireless power transmitting and receiving circuitry in accordance with some embodiments.

FIG. 2 is a circuit diagram of illustrative wireless charging circuitry for system 8. As shown in FIG. 2, circuitry 52 may include inverter circuitry such as one or more inverters 61 or other drive circuitry that produces wireless power signals that are transmitted through an output circuit that includes one or more coils 36 and capacitors such as capacitor 70. In some embodiments, device 12 may include multiple individually controlled inverters 61, each of which supplies drive signals to a respective coil 36. In other embodiments, an inverter 61 is shared between multiple coils 36 using switching circuitry.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry (e.g., multiplexer circuitry) can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16. The relative phase between the inverters can be adjusted dynamically (e.g., a pair of inverters 61 may produce output signals in phase or out of phase (e.g., 180° out of phase).

The application of drive signals using inverter(s) 61 (e.g., transistors or other switches in circuitry 52) causes the output circuits formed from selected coils 36 and capacitors 70 to produce alternating-current electromagnetic fields (signals 44) that are received by wireless power receiving circuitry 54 using a wireless power receiving circuit formed from one or more coils 48 and one or more capacitors 72 in device 24.

If desired, the relative phase between driven coils 36 (e.g., the phase of one of coils 36 that is being driven relative to another adjacent one of coils 36 that is being driven) may be adjusted by control circuitry 16 to help enhance wireless power transfer between device 12 and device 24. Rectifier circuitry 50 is coupled to one or more coils 48 (e.g., a pair of coils) and converts received power from AC to DC and supplies a corresponding direct current output voltage Vrect across rectifier output terminals 76 for powering load circuitry in device 24 (e.g., for charging battery 58, for powering a display and/or other input-output devices 56, and/or for powering other components). A single coil 48 or multiple coils 48 may be included in device 24. In an illustrative configuration, device 24 may be a wristwatch or other portable device with at least two coils 48. These two (or more) coils 48 may be used together when receiving wireless power. Other configurations may be used, if desired.

Figure 3:
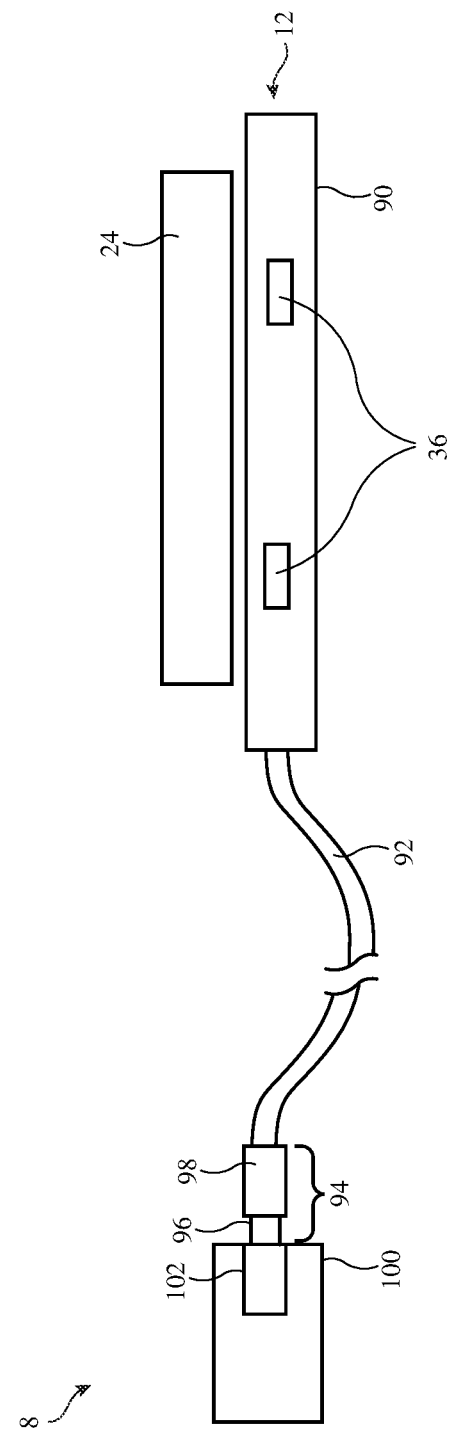
FIG. 3 is a side view of an illustrative wireless power transmitting device such as a wireless charging puck connected to a connector plug via a cable in accordance with some embodiments.

FIG. 3 is a cross-sectional side view of system 8 in an illustrative configuration in which wireless power transmitting device 12 is a wireless charging puck and in which wireless power receiving device 24 is a wristwatch, as an example. As shown in FIG. 3, device 12 has a device housing 90 (e.g., a disk-shaped puck housing formed form polymer, other dielectric material, and/or other materials). Device housing 90 may house a device microcontroller for communicating with plug 94, DC-DC power converter circuitry such as a step-down voltage converter (e.g., a buck converter), voltage regulator circuitry such as a low-dropout (LDO) regulator, wireless power transmitting circuitry such as inverter 61 (see FIG. 2), coil(s) 36, and capacitor 70, near-field communications (NFC) circuitry for communicating with power receiving device 24, over-temperature protection (OTP) circuitry such as a temperature sensor, debug circuitry, filter circuitry, magnetic alignment structures such as magnets for attracting device 12 during charging operations, and/or other power transmitting device components.

Cable 92 is coupled to device housing 90 and provides power to coil(s) 36. One end of cable 92 may be pigtailed to housing 90. The opposing end of cable 92 is terminated using plug 94. Plug 94 has a boot portion 98 sometimes referred to as the "boot" of the plug. Boot 98, which may sometimes be referred to as a connector boot, may be formed from polymer, metal, and/or other materials and may have an interior region configured to house electrical components (e.g., integrated circuits, discrete components such as transistors, printed circuits, etc.). Boot 98 has a first end connected to cable 92 and a second end connected to a connector portion 96 (sometimes referred to as the "connector" of the plug). Connector 96 may include 24 pins, 10-30 pins, 10 or more pins, 20 or more pins, 30 or more pins, 40 or more pins, 50 or more pins, or any suitable number of pins supported within a connector housing. The pins within connector 96 are configured to mate with corresponding pins in port 102 of external equipment such as device 100. Device 100 may be a stand-alone power adapter, an electronic device such as a computer, or other equipment that provides DC power to plug 94 through port 102. Port 102 may be, for example, a USB port (e.g., a USB type-C port, a USB 4.0 port, a USB 3.0 port, a USB 2.0 port, a micro-USB port, etc.) or a Lightning connector port. Plug 96 having a connector protruding from boot 98 may be referred to as a male plug. Plug 96 can be a reversible plug (i.e., a plug that can be mated with a corresponding connector port in at least two different and symmetrical orientations).

During normal operation of system 8, power receiving device 24 may be placed on the charging surface of power transmitting device 12. Device 24 and device 12 may have magnets (and/or magnetic material such as iron). For example, device 24 may have a magnet and device 12 may have a corresponding mating magnet. These magnets attract each other and thereby hold devices 12 and 24 together during charging.

Figure 4A:
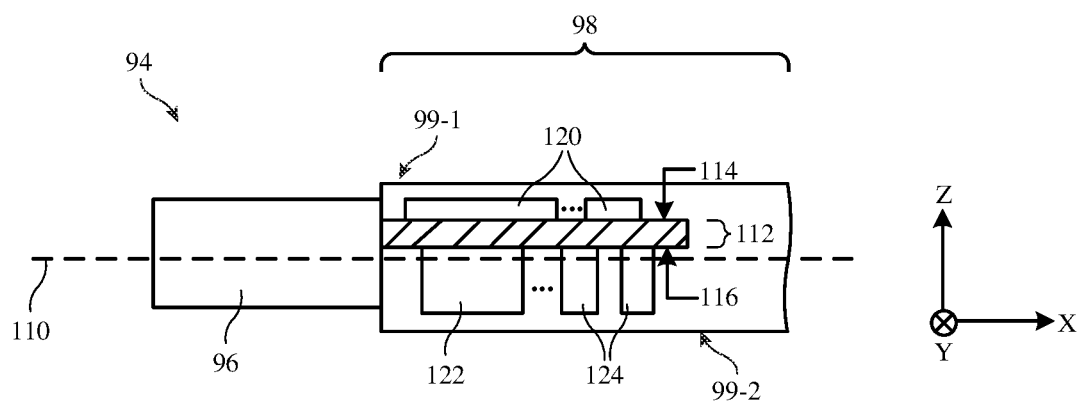
FIG. 4A is a cross-sectional side view of a plug showing a printed circuit board that is closer to the upper boot wall in accordance with some embodiments.

Boot 98 may have a boot housing that houses various electrical components. The boot housing may house a boot microcontroller for communicating with the device microcontroller in housing 90, DC-DC power converter circuitry such as a step-up voltage converter (e.g., a boost converter), voltage regulator circuitry such as a low-dropout (LDO) regulator, electronic fuse circuitry such as an e-fuse or fuse for providing overcurrent protection when detecting short circuits, overloading, mismatched loads, or other device failure events, filter circuitry, and/or other boot components. FIG. 4A is a cross-sectional side view of plug 94. As shown in FIG. 4A, boot 98 may include a printed circuit board 112 on which multiple electrical components can be mounted. Printed circuit board 112 may be coplanar with the X-Y plane. Boot 98 may therefore have a thickness that extends along the Z-axis.

As described above, power converter circuitry may be disposed within boot 98. Power converter circuitry such as a step-up voltage converter (e.g., a boost converter) may include relatively large components such as a large power converter inductor and large power converter capacitors. To optimize for power density, the power converter inductors and capacitors may be implemented as relatively tall passive components within boot 98. There is, however, a limited amount of space within boot 98 to house the various electrical components. It can therefore be challenging to fit all the requisite boot electronics along with power converter circuitry within the limited space inside a boot housing.

To accommodate all of the components within boot 98, printed circuit board 112 may be offset in the Z-direction so that the taller electrical components can be disposed on one side of board 112 and the shorter electrical components can be disposed on the opposing side of board 112. Plug 94 may have a center plane 110 that divides connector 96 and boot 98 in half. Center plane 110 is parallel to the X-Y plane. In the example of FIG. 4A, printed circuit board 112 is shifted up in the Z direction above plane 110 so that board 112 is positioned closer to the upper wall 99-1 of the boot housing and is thus positioned farther away from the lower wall 99-2 of the boot housing. The taller components such as power converter inductor 122, power converter capacitors 124 (e.g., low noise capacitors), and other taller passive components (e.g., resistors and/or other load components) may be mounted on the lower surface 116 of the printed circuit board. A boot microcontroller and other relatively shorter semiconductor components 120 may be mounted on the top surface 114 of the printed circuit board. Arranged in this way, the overall size of boot 98 can be minimized.

The taller components (e.g., components 122 and 124) disposed on the bottom surface 116 of the printed circuit board may be at least 10%, 20%, 50%, 100%, 10-100%, 100-200%, 200-300%, 300-400%, 400-500% 100-500%, or more than 500% taller than the shorter components (e.g., components 120) disposed on the top surface 114 of the printed circuit board. The heights of the taller components can vary. The heights of the shorter components can vary. Depending on the relative height of these components, the distance between board 112 and the lower boot wall 99-2 may be at least 10%, 20%, 10-50%, 50-100% 100-200%, 200-300%, 300-400%, 400-500%, 100-500%, or more than 500% greater than the distance between board 112 and the upper boot wall 99-1. Any number of taller components can be mounted on the side of board 112 with more available Z-height. Any number of shorter components can be mounted on the side of board 112 with more limited Z-height.

Figure 4B:
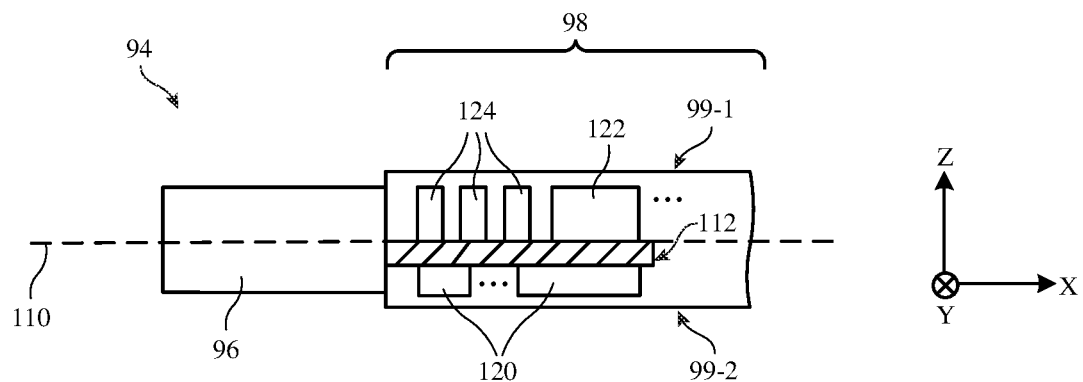
FIG. 4B is a cross-sectional side view of a plug showing a printed circuit board that is closer to the lower boot wall in accordance with some embodiments.

The example of FIG. 4A in which printed circuit board 112 is positioned closer to the upper boot housing wall is merely illustrative. FIG. 4B illustrates another suitable embodiment in which printed circuit board 112 is positioned closer to the lower boot housing wall. As shown in FIG. 4B, printed circuit board 112 is shifted downwards in the Z direction below plane 110 so that board 112 is closer to the lower wall 99-2 of the boot housing and is thus farther away from the upper wall 99-1 of the boot housing. Configured in this way, the taller components such as power converter inductor 122, power converter capacitors 124, and other taller passive components (e.g., resistors and/or other load components) may be mounted on the upper surface of printed circuit board 112. A boot microcontroller and other relatively shorter semiconductor components 120 may be mounted on the bottom surface of printed circuit board 112.

The taller components (e.g., components 122 and 124) disposed on the top surface of the printed circuit board 112 may be at least 10%, 20%, 50%, 100%, 10-100%, 100-200%, 200-300%, 300-400%, 400-500% 100-500%, or more than 500% taller than the shorter components (e.g., components 120) disposed on the bottom surface of printed circuit board 112. The heights of the taller components can vary. The heights of the shorter components can vary. Depending on the relative height of these components, the distance between board 112 and the upper boot wall 99-1 may be at least 10%, 20%, 10-50%, 50-100% 100-200%, 200-300%, 300-400%, 400-500%, 100-500%, or more than 500% greater than the distance between board 112 and the lower boot wall 99-2. Any number of taller components can be mounted on the side of board 112 with more available Z-height. Any number of shorter components can be mounted on the side of board 112 with more limited Z-height.

Figure 4C:
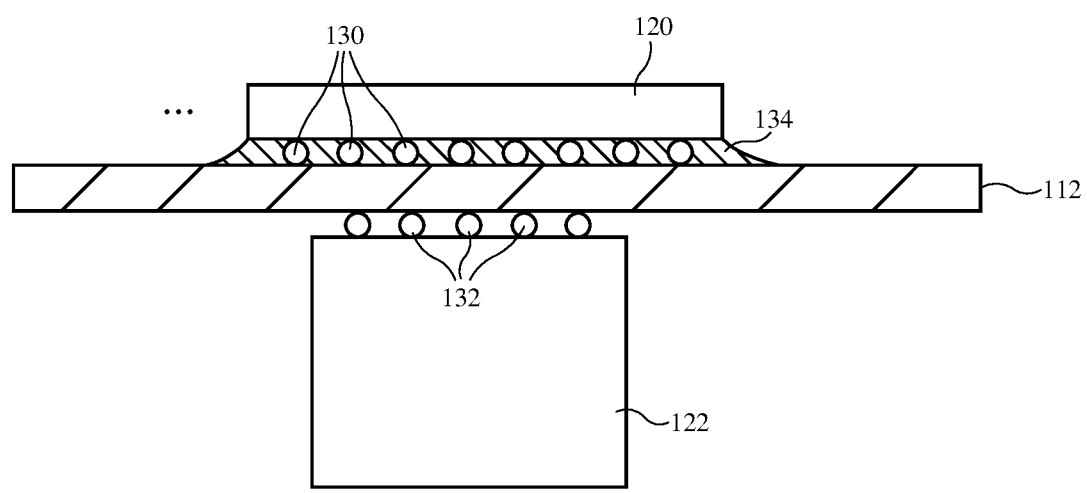
FIG. 4C is a cross-sectional side view showing how underfill material may be disposed under the thinner components but not under the taller components within a boot in accordance with some embodiments.

FIG. 4C is a cross-sectional side view showing how underfill material may be disposed under the shorter components but not under the taller components within the boot. As shown in FIG. 4C, a boot microcontroller 120 is coupled to the upper surface of printed circuit board 112 via a first set of solder bumps 130, whereas an inductor 122 is coupled to the lower surface of printed circuit board 112 via a second set of solder bumps 132. Underfill material 134 may be disposed under boot microcontroller 120 and under the other short semiconductor components mounted on the top surface of board 112. The shorter semiconductor components are sometimes considered "active" electronic components, which generally dissipate more heat than the passive components. The underfill material 134 can help provide better thermal dissipation for the active components within the boot. In contrast, the passive components such as inductor 122 and low noise capacitors 124 disposed on the opposing side of printed circuit board 112 do not need to be underfilled. Underfilling low noise capacitors 124 can also degrade the low noise capability of these capacitors. Thus, not underfilling the taller passive components can help save a processing step while maximizing the performance of the low noise capacitors 124.

Figure 5A:
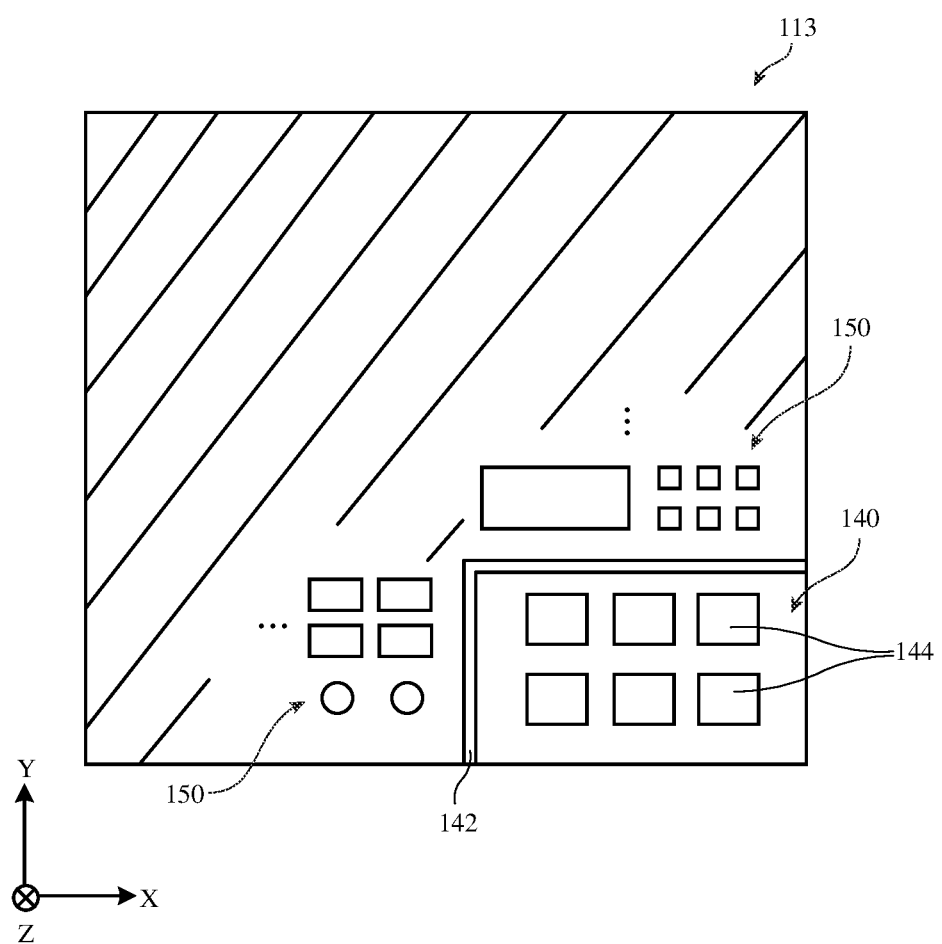
FIG. 5A is a top (layout) plan view of a printed circuit board having an underfill barrier configured to prevent underfill material from reaching low acoustic noise capacitors in accordance with some embodiments.

FIG. 5A illustrates another suitable embodiment in which some of the components mounted on a surface of a printed circuit board 113 are underfilled while other components on the surface of board 113 are not underfilled (i.e., are free or devoid of any underfill material). Printed circuit board 113 may represent the printed circuit board disposed within device housing 90 or the printed circuit board 112 disposed within the boot housing. As shown in the top (layout) plan view of FIG. 5A looking into the X-Y plane in the Z direction, multiple components such as components 144 and 150 may be mounted on a given surface of board 113.

It may be desirable to underfill components 154 (as shown in the shaded region) while leaving components 144 free of any underfill material. Components 114 might be low acoustic noise capacitors that are coupled to the power supply rail of inverter 61. Such type of low acoustic noise capacitors should generally not be underfilled for optimal low-noise performance. To prevent the underfill material from reaching components 144 during fabrication, printed circuit board 113 may be provided with an underfill barrier structure such as underfill barrier 142. Underfill barrier 142 may be formed from metal (e.g., copper, aluminum, tungsten, silver, etc.), dielectric, or other suitable semiconductor material that can be configured to block underfill material from entering region 140 in which components 144 are arranged. Underfill barrier 142 should be disposed prior to depositing the underfill material. Region 140 may therefore sometimes be referred to as an underfill-free area or an underfill-less trench region.

Figure 5B:
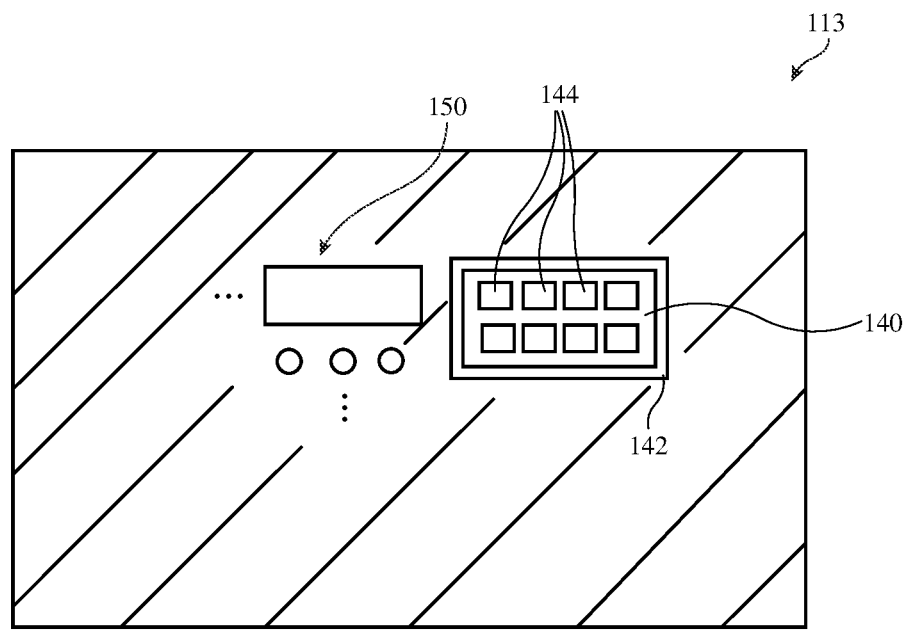
FIG. 5B is a top plan view showing a printed circuit board having an underfill barrier surrounding a region closer to the center of the printed circuit board in accordance with some embodiments.

The example of FIG. 5A in which the underfill-free trench region 140 is at a corner of printed circuit board 113 is merely illustrative. FIG. 5B shows another suitable embodiment in which the underfill-free trench region 140 is away from the edge of printed circuit board 113. As shown in FIG. 5B, underfill barrier 142 may completely surround region 140 so as to form a moat-like structure around region 140. Any number of components 144 may be arranged within region 140. Although the shape of region 140 is shown as being rectangular, the shape of region 140 can be any suitable shape (e.g., a square shape, a triangular shape, a shape with one or more curved edges, a shape with curved and straight edges, a circular shape, an elliptical shape, an irregular shape, etc.).

Figure 5C:
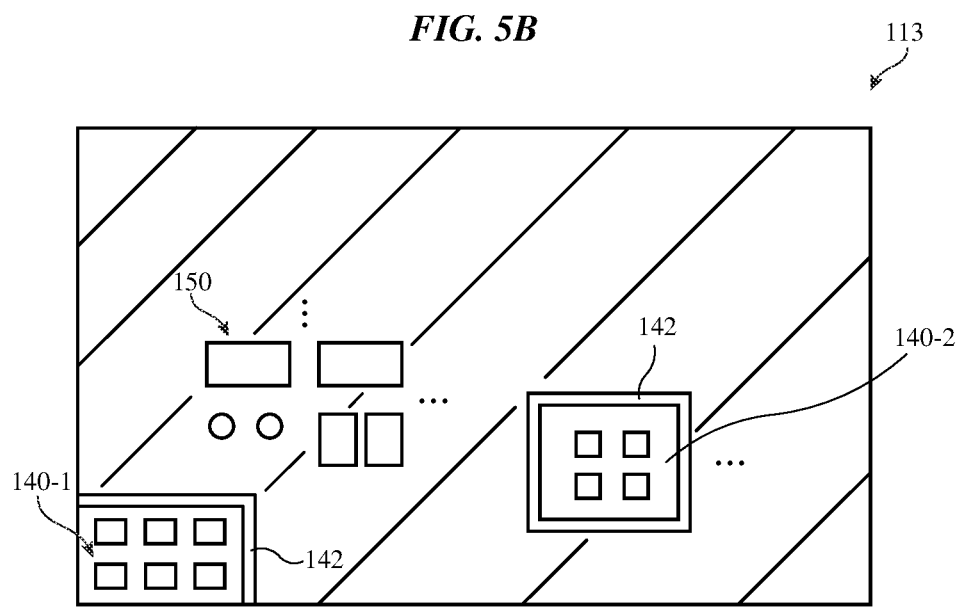
FIG. 5C is a top plan view showing a printed circuit board having multiple underfill barriers surrounding different regions on the printed circuit board in accordance with some embodiments.

The examples of FIGS. 5A and 5B in which there is one region 140 on a surface of printed circuit board 113 is merely illustrative. In general, one or more regions 140 can be located on the top and/or bottom surface of printed circuit board 113. FIG. 5C illustrates another suitable embodiment in which at least two underfill-free trench regions are formed on printed circuit board 113. As shown in FIG. 5C, a first region 140-1 may be located at a corner of board 113, whereas a second region 140-2 may be located closer to the center of board 113. Region 140-1 may have a first underfill barrier 142 located on only two sides of region 140-1. Region 140-2 may have a second underfill barrier 142 (e.g., a copper ring) located on all four sides of region 140-2. Any number of components 144 may be arranged within regions 140-1 and 140-2. Regions 140-1 and 140-2 can have any shape. As another example, printed circuit board 113 may have regions 140 located at two or more corners or three or more corners of board 113. As another example, printed circuit board 113 may have two or more discrete regions 140-2 of the same or different sizes located away from the edges of board 113.

The embodiments of FIGS. 5A, 5B, and 5C can be combined with the embodiments of FIGS. 4A, 4B, and 4C (i.e., the embodiments of FIGS. 4 and 5 are not mutually exclusive). For example, one or more regions 140 may be located at the side of printed circuit board 112 on which the shorter underfilled components are mounted. If desired, at least some of the taller non-underfilled components disposed on the opposing surface of board 112 may be surrounded by an underfill barrier structure 142.

Figure 6A:
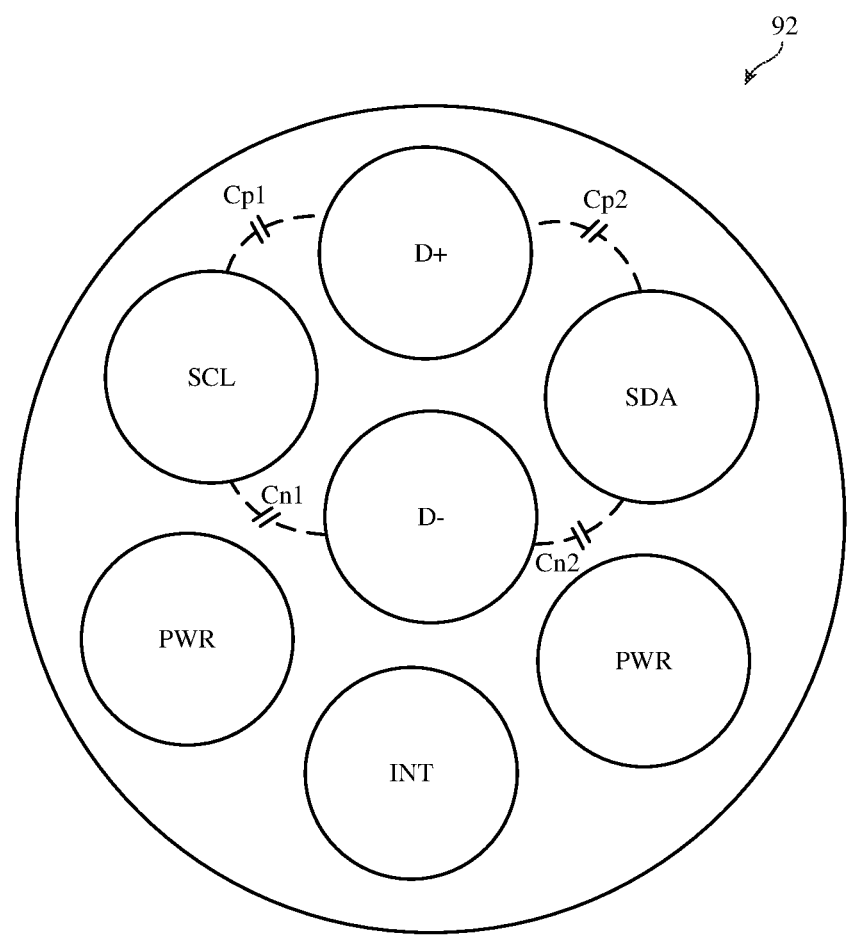
FIGS. 6A-6D are cross-sectional views of a cable with a differential data path interposed between two single-ended signal paths to mitigate crosstalk in accordance with some embodiments.

In accordance with another embodiment, cable 92 may (as an example) be a 7-wire cable. Cable 92 may have a length that is equal to 1 meter, less than 1 meter, greater than 1 meter, 50-100 cm, 10-50 cm, 100-150 cm, 150-200 cm, or other suitable length. FIG. 6A shows a cross-sectional view of cable 92 having seven wires, which include two power (PWR) wires (e.g., wires configured to convey power supply signals such as positive power supply voltages and ground power supply voltages), an interrupt (INT) signal wire (e.g., a wire for conveying an interrupt signal, a status signal, or other control signal), a differential signal path (e.g., a differential signal path having a positive signal wire D+ and an associated negative signal wire D−), and at least two single-ended communication wires SDA and SCL. Differential wires D+ and D− may serve collectively as a high-speed data path to convey information during firmware updates (as an example). Wires SDA and SCL may be a serial data line and a serial clock line, respectively, for the I²C bus interface. If care is not taken, signal crosstalk may exist between wires SDA and SCL.

To mitigate signal crosstalk between wires SDA and SCL, the differential signal path may be interposed between wires SDA and SCL such that the amount of capacitive coupling from wire SDA to the differential path is equal to the amount of capacitive coupling from wire SCL to the differential path. In the example of FIG. 6A, wire SCL may be capacitively coupled to positive differential wire D+ by a parasitic amount Cp1 and may be capacitively coupled to negative differential wire D− by a parasitic amount Cn1. Similarly, wire SDA may be capacitively coupled to positive differential wire D+ by a parasitic amount Cp2 and may be capacitively coupled to negative differential wire D− by a parasitic amount Cn2.

These wires should be arranged such that Cp1 is equal to Cp2 and such that Cn1 is equal to Cn2. To accomplish this, the distance between SCL and D+ should be equal to the distance between SDA and D+ (e.g., so that Cp1=Cp2). Similarly, the distance between SCL and D− should be equal to the distance between SDA and D− (e.g., so that Cn1=Cn2). Arranged in this way, the differential signal wires D+ and D− can cancel out or minimize any signal crosstalk between the serial communication wires SCL and SDA.

Figure 6B:
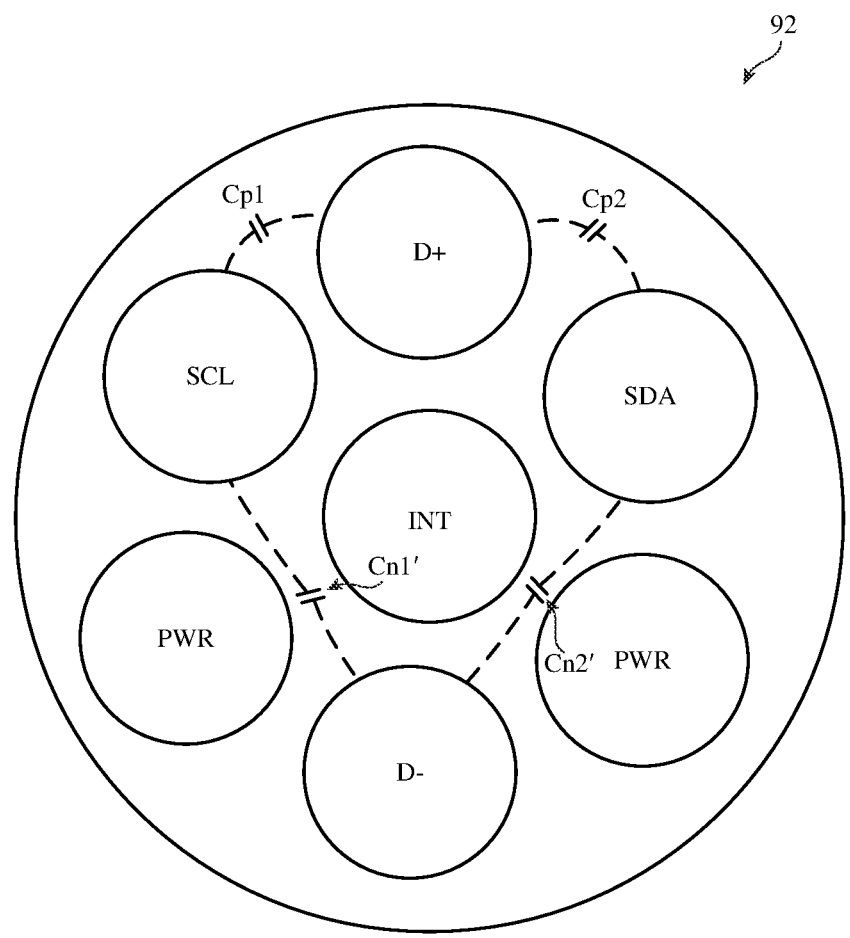

The example of FIG. 6A in which the distance between SCL and D+ is equal to the distance between SCL and D− is merely illustrative. FIG. 6B shows another suitable embodiment where the distance between SCL and D+ is not equal to the distance between SCL and D−. As shown in FIG. 6B, the position of wires INT and D− are swapped relative to the cabling arrangement of FIG. 6A. In the example of FIG. 6B, wire SCL may be capacitively coupled to positive differential wire D+ by a parasitic amount Cp1 and may be capacitively coupled to negative differential wire D− by a parasitic amount Cn1'. Similarly, wire SDA may be capacitively coupled to positive differential wire D+ by a parasitic amount Cp2 and may be capacitively coupled to negative differential wire D− by a parasitic amount Cn2'.

These wires should be arranged such that Cp1 is equal to Cp2 and such that Cn1' is equal to Cn2'. To accomplish this, the distance between SCL and D+ should be equal to the distance between SDA and D+ (e.g., so that Cp1=Cp2). Similarly, the distance between SCL and D− should be equal to the distance between SDA and D− (e.g., so that Cn1'=Cn2'). Arranged in this way, the differential signal wires D+ and D− can cancel out or minimize any signal crosstalk between the serial communication wires SCL and SDA.

Figure 6C:
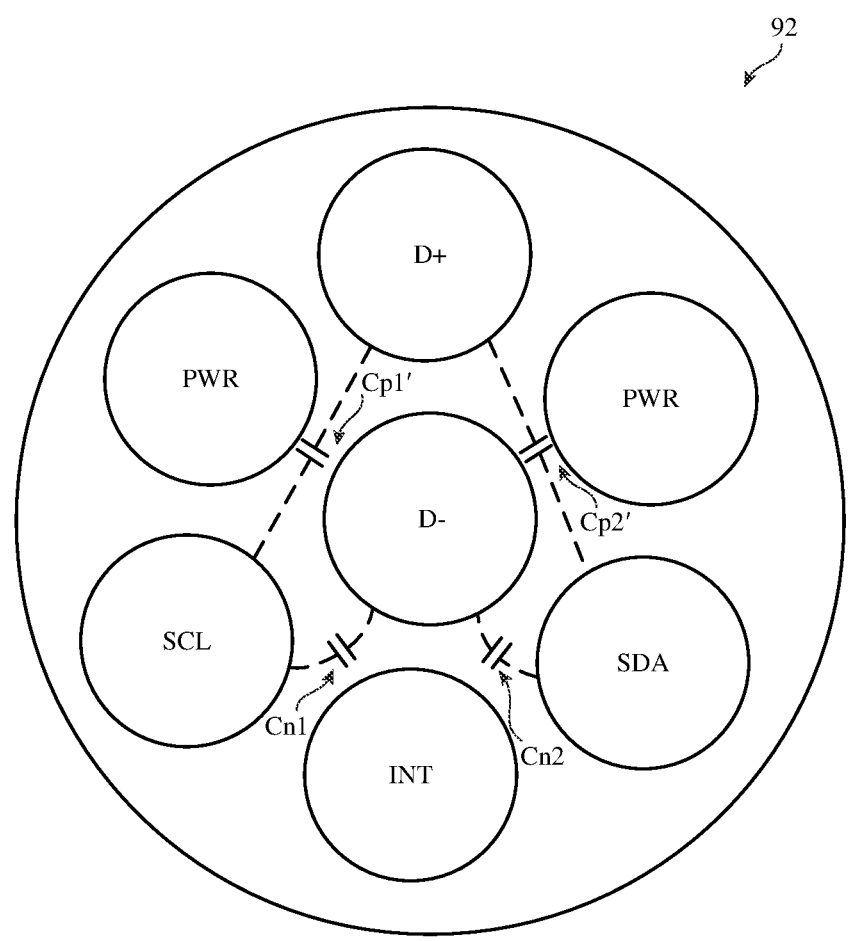

The example of FIG. 6B in which wires SCL and SDA are arranged closer to wire D+ than to wire D− is merely illustrative. FIG. 6C shows another suitable embodiment where wires SCL and SDA are arranged closer to wire D− than to wire D+. As shown in FIG. 6C, the position of wires SCL and SDA are swapped with the PWR wires relative to the cabling arrangement of FIG. 6A. In the example of FIG. 6C, wire SCL may be capacitively coupled to positive differential wire D+ by a parasitic amount Cp1' and may be capacitively coupled to negative differential wire D− by a parasitic amount Cn1. Similarly, wire SDA may be capacitively coupled to positive differential wire D+ by a parasitic amount Cp2' and may be capacitively coupled to negative differential wire D− by a parasitic amount Cn2.

These wires should be arranged such that Cp1' is equal to Cp2' and such that Cn1 is equal to Cn2. To accomplish this, the distance between wires SCL and D+ should be equal to the distance between SDA and D+ (e.g., so that Cp1'=Cp2'). Similarly, the distance between SCL and D− should be equal to the distance between SDA and D− (e.g., so that Cn1=Cn2). Arranged in this way, the differential signal wires D+ and D− can cancel out or minimize any signal crosstalk between the serial communication wires SCL and SDA.

Figure 6D:
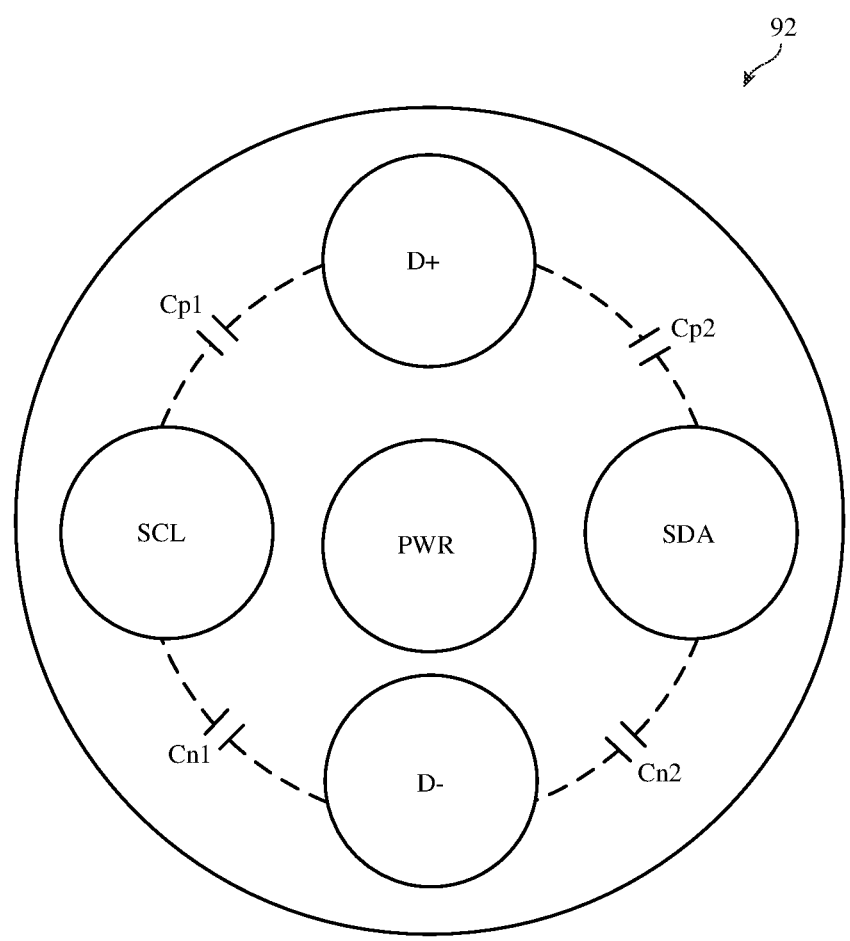

The example of FIGS. 6A-6C in which cable 92 includes only seven wires is merely illustrative. FIG. 6D illustrates another suitable embodiment in which cable 92 includes five wires. As shown in FIG. 6D, cable 92 may include a differential signal path with wires D+ and D−, a power line PWR, and serial signal wires SCL and SDA. In the example of FIG. 6D, wire SCL may be capacitively coupled to positive differential wire D+ by a parasitic amount Cp1 and may be capacitively coupled to negative differential wire D− by a parasitic amount Cn1. Similarly, wire SDA may be capacitively coupled to positive differential wire D+ by a parasitic amount Cp2 and may be capacitively coupled to negative differential wire D− by a parasitic amount Cn2.

These wires should be arranged such that Cp1 is equal to Cp2 and such that Cn1 is equal to Cn2. To accomplish this, the distance between wires SCL and D+ should be equal to the distance between SDA and D+ (e.g., so that Cp1=Cp2). Similarly, the distance between SCL and D− should be equal to the distance between SDA and D− (e.g., so that Cn1=Cn2). Arranged in this way, the differential signal wires D+ and D− can cancel out or minimize any signal crosstalk between the serial communication wires SCL and SDA.

In general, cable 92 may include any suitable number of wires (e.g., four or more wires, five or more wires, six or more wires, seven or more wires, eight or more wires, 5-10 wires, 10 or more wires, etc.). The example of FIGS. 6A-6D having I²C serial bus wires SCL and SDA is merely illustrative. In general, cable 92 may include two or more single-ended wires that convey information using any suitable serial communication standard/protocol. These single-ended wires can be separated by one or more differential signal paths to reduce crosstalk. The level of crosstalk can be minimized by ensuring that each of the single-ended wires are capacitively coupled to the differential path by an equivalent amount.

Figure 7A:
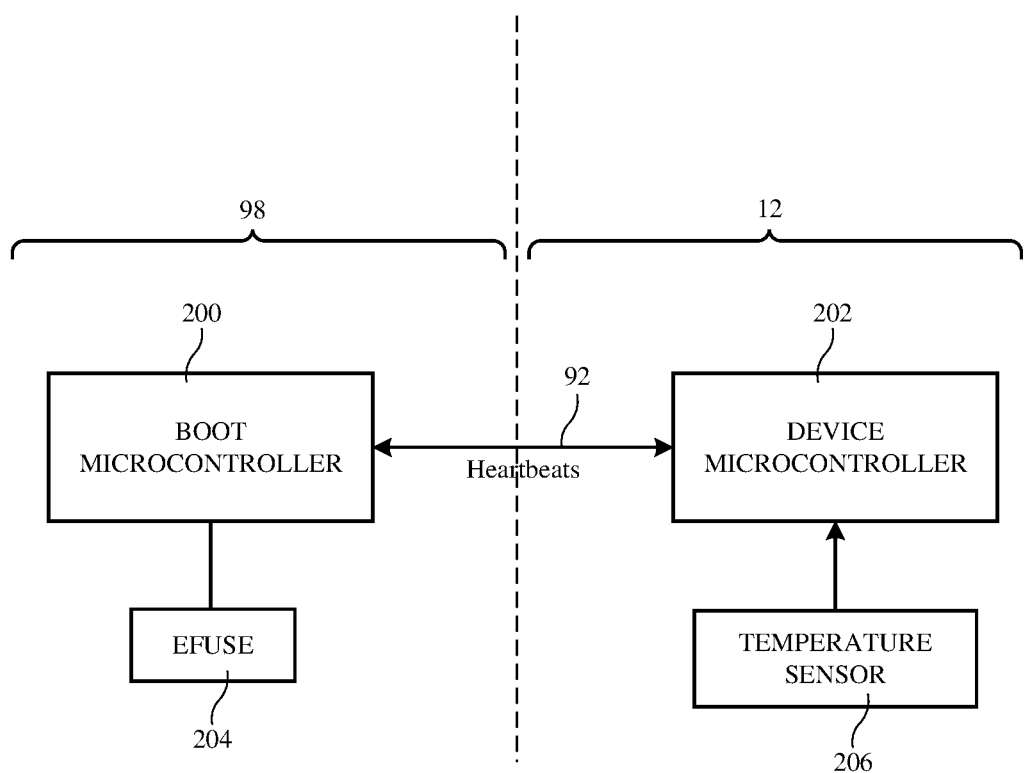
FIG. 7A is a diagram showing how heartbeat signals can be transmitted between a power transmitting device and a plug in accordance with some embodiments.

In accordance with another embodiment, heartbeat signals may be conveyed between boot 98 and power transmitting device 12 so that boot 98 can know that device 12 is still connected or operating normally and/or vice versa. FIG. 7A shows how boot 98 has a boot microcontroller 200 (sometimes referred to as being part of boot control circuitry) configured to send and/or receive heartbeat signals to and from power transmitting device 12. Boot 98 may also include an electronic fuse (e-fuse or fuse circuitry) 204 configured to provide overcurrent protection in response to detecting when device 12 is overheating, when device 12 is disconnected from boot 98, when a short circuit in boot 98 and/or device 12 has occurred, when there is overloading or mismatched loads, and/or other device failure events. When such failure events occur, e-fuse 204 may be latched off to stop boot 98 from further providing power to device 12.

In one example, boot microcontroller 200 may transmit heartbeat signals, via cable 92, to device 12 to let device 12 know that the boot is still functioning properly. Device 12 may include a device microcontroller 202 (sometimes referred to as being part of the device control circuitry 16 of FIG. 1) configured to send heartbeat signals to boot 98 via cable 92 to let boot 98 know that device 12 is still functioning properly. In other words, heartbeat signals can be conveyed between boot 98 and device 12 in both directions.

In another example, only device 12 may send heartbeat signals to boot 98 (i.e., boot 98 may not send any heartbeat signals to device 12). In yet another example, only boot 98 may send heartbeat signals to device 12 (i.e., device 12 may not send any heartbeat signals to boot 98).

Power transmitting device 12 may be provided with thermal protection hardware including a temperature sensor 206 coupled to device microcontroller 202. Temperature sensor 206 may measure the temperature of components housed within device housing 90 (see FIG. 3) and may output a temperature sensor value. When the temperature sensor value exceeds a predetermined threshold, device microcontroller 202 may stop sending heartbeat signals back to boot microcontroller 200. As a result, boot 98 may latch off fuse circuitry 204 and may stop providing power to device 12.

Figure 7B:
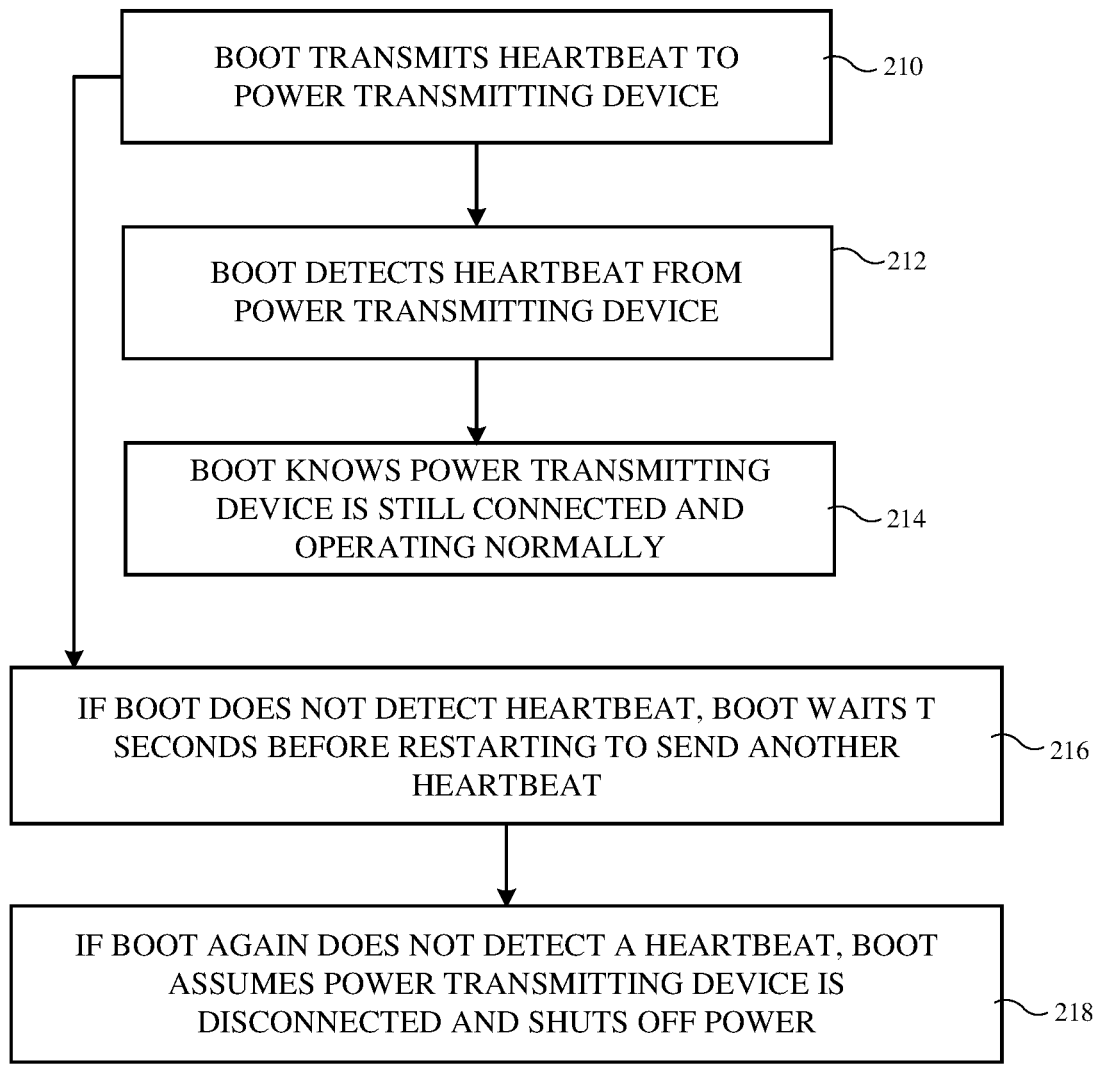
FIG. 7B is a flow chart of illustrative steps for using a plug to send heartbeat signals to a power transmitting device in accordance with some embodiments.

FIG. 7B is a flow chart of illustrative steps for using boot 98 to communicate with power transmitting device 12. At step 210, boot 98 can optionally transmit a heartbeat signal to power transmitting device 12 (e.g., a wireless charging puck). At step 212, boot 98 may detect a heartbeat signal transmitted from power transmitting device 12. If boot 98 detects such heartbeat signal from device 12, boot 98 continues to operate with power transmitting device 12 (step 214).

If, however, boot 98 does not detect a heartbeat signal from power transmitting device 12, boot 98 may wait T seconds before restarting to optionally send another heartbeat signal to device 12 (see step 216). Value T may be 1 second, 2 seconds, 3 seconds, 4 seconds, 1-5 seconds, 1-10 seconds, greater than 1 second, less than 1 second, or other suitable wait time that can optionally be programmed by boot microcontroller 200.

If boot 98 again does not to detect a heartbeat signal from power transmitting device 12, boot 98 will now assume that device 12 is disconnected or is otherwise disabled and will proceed to shut off the power, such as by latching off fuse circuitry 204 at step 218.

Figure 7C:
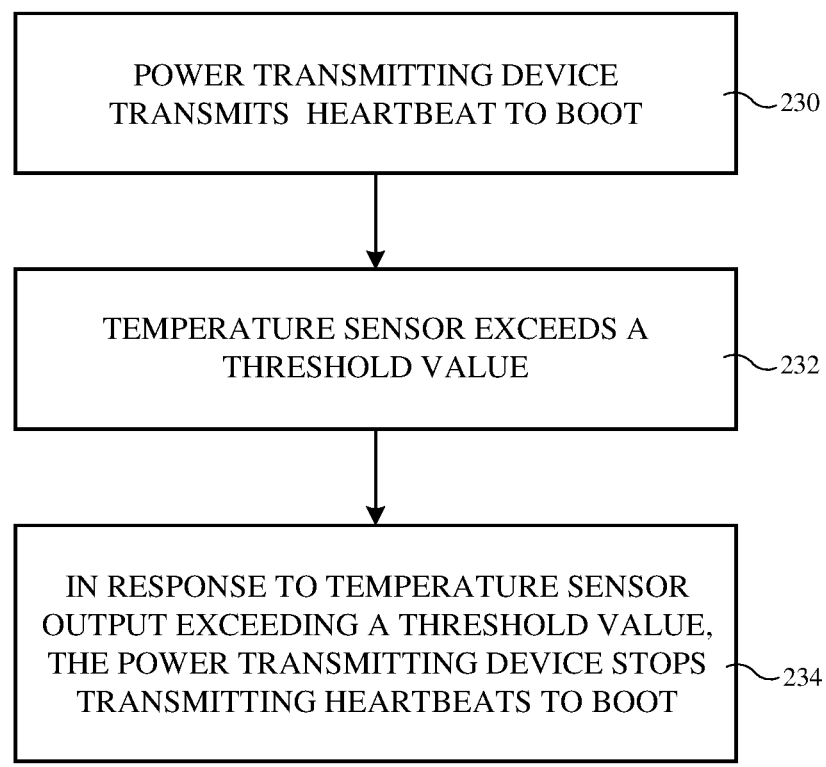
FIG. 7C is a flow chart of illustrative steps for using a power transmitting device to send heartbeat signals to a plug in accordance with some embodiments.

FIG. 7C is a flow chart of illustrative steps for using power transmitting device 12 to communicate with boot 98. At step 230, power transmitting device 12 (e.g., a wireless charging puck) may transmit a heartbeat signal to boot 98. Power transmitting device 12 may periodically send heartbeat signals to boot 98. For example, power transmitting device 12 may be configured to send a heartbeat signal to boot 98 at least once per second (1 Hz or more), at least twice per second (2 Hz or more), at least three times per second (3 Hz or more), at least 4 times per second (4 Hz or more), at least 5 times per second (5 Hz or more), 2-10 times per second, more than 10 times per second, at least once every two seconds, at least once every three seconds, at least once every four seconds, at least once every five seconds, at least once every 1-5 seconds, at least once every 5-10 seconds, or at other suitable periodicity to boot 98 during operation.

At step 232, temperature sensor 206 (see FIG. 7A) may detect an output by sensor 206 that exceeds a predetermined threshold value. In response thereto, power transmitting device 12 may prevent device microcontroller 202 from outputting a heartbeat signal to boot 98 to mimic a wire disconnection (at step 234). As a result, boot microcontroller 200 will no longer detect any heartbeats from device 12, which causes power to be shut off as described in connection with FIG. 7B. Power may later resume, when the temperature value from sensor 206 is below another threshold value, at which time device microcontroller 202 resumes sending heartbeats to boot 98.

The foregoing is merely illustrative and various modifications can be made to the described embodiments. The foregoing embodiments may be implemented individually or in any combination.

What is claimed is:

1. A wireless power transmitting device, comprising:
   a device housing;
   at least one wireless power transmitting coil within the device housing;
   a cable having a first end connected to the device housing and having a second end; and
   a plug connected to the second end of the cable, wherein the plug comprises:
      a boot with a boot housing having an upper wall and a lower wall;
      a connector extending from the boot;
      a printed circuit board disposed within the boot housing, wherein the printed circuit board is positioned a first distance from the upper wall and a second distance, different than the first distance, from the lower wall;
      an active electronic component disposed on an upper surface of the printed circuit board facing the upper wall;
      a passive electronic component disposed on the upper surface of the printed circuit board facing the upper wall; and
      an underfill barrier structure disposed on the upper surface between the active electronic component and the passive electronic component, wherein underfill material is disposed under the active electronic component and wherein the passive electronic component is free of underfill material.

2. The wireless power transmitting device of claim 1, wherein the second distance is greater than the first distance, wherein the active electronic component has a first height, and wherein the plug comprises an additional passive electronic component having a second height, greater than the first height, mounted on a lower surface of the printed circuit board facing the lower wall.

3. The wireless power transmitting device of claim 1, wherein:
   the device housing houses an inverter configured to drive the at least one wireless power transmitting coil and houses a device microcontroller; and
   the boot housing houses a converter and a boot microcontroller that communicates with the device microcontroller.

4. The wireless power transmitting device of claim 3, wherein:
   the second distance is greater than the first distance; and
   the converter comprises an inductor mounted on a lower surface of the printed circuit board facing the lower wall.

5. The wireless power transmitting device of claim 1, wherein the plug comprises:
   a plurality of passive electronic components mounted on a lower surface of the printed circuit board facing the lower wall.

6. The wireless power transmitting device of claim 5, wherein the active electronic component has a first height, and wherein the plurality of passive electronic components have second heights greater than the first height.

7. The wireless power transmitting device of claim 6, wherein the second distance is greater than the first distance.

8. The wireless power transmitting device of claim 5, wherein a region between the plurality of passive electronic components and the lower surface of the printed circuit board is devoid of underfill material.

9. The wireless power transmitting device of claim 1, wherein the plug comprises:
   only passive electronic components disposed on a lower surface of the printed circuit board facing the lower wall.

10. A wireless power transmitting device, comprising:
   a device housing;
   at least one wireless power transmitting coil within the device housing;
   a cable having a first end connected to the device housing and having a second end; and
   a plug connected to the second end of the cable, wherein the plug comprises:
      a boot with a boot housing;
      a connector extending from the boot;
      a printed circuit board disposed within the boot housing;
      only active components having first heights disposed on a first outer surface of the printed circuit board;
      passive components having second heights, greater than the first height, disposed on a second outer surface of the printed circuit board opposing the first outer surface; and
      an underfill barrier structure separating the second outer surface of the printed circuit board into a first region in which the passive components are disposed and a second region, wherein the first region is free of underfill material and wherein the second region includes underfill material.

11. The wireless power transmitting device of claim 10, wherein the second heights are at least 50% greater than the first heights.

12. The wireless power transmitting device of claim 10, wherein:
   the active components comprise a boot microcontroller; and
   the passive components comprise an inductor and a capacitor.

13. The wireless power transmitting device of claim 10, wherein:
   the boot housing has an upper wall and a lower wall; and
   the printed circuit board is positioned a first distance from the upper wall and a second distance, different than the first distance, from the lower wall.

14. The wireless power transmitting device of claim 13, wherein the second distance is greater than the first distance.

15. The wireless power transmitting device of claim 14, wherein the second distance is at least 20% greater than the first distance.

16. An apparatus comprising:
   a housing having a first end, a second end opposing the first end, a first wall, and a second wall opposing the first wall;
   a connector extending from the first end of the housing;
   a cable extending from the second end of the housing;
   a circuit board disposed within the housing and positioned a first distance from the first wall and a second distance, greater than the first distance, from the second wall;
   first electronic components disposed on a first surface of the circuit board facing the first wall; and
   underfill material disposed under the first electronic components;
   second electronic components disposed on a second surface of the circuit board facing the second wall, the second electronic components being free of underfill material; and
   an underfill barrier structure at least partially surrounding the second electronic components on the second surface of the circuit board.

17. The apparatus of claim 16, wherein the first electronic components comprise active components having first heights and wherein the second electronic components comprise passive components having second heights, greater than the first heights.

* * * * *

UNITED STATES PATENT AND TRADEMARK OFFICE
CERTIFICATE OF CORRECTION

| | | |
|---|---|---|
| PATENT NO. | : 11,476,707 B2 | Page 1 of 1 |
| APPLICATION NO. | : 17/108923 | |
| DATED | : October 18, 2022 | |
| INVENTOR(S) | : Thirumalai Ananthan Pillai et al. | |

It is certified that error appears in the above-identified patent and that said Letters Patent is hereby corrected as shown below:

On the Title Page

Item (72) The inventorship has been corrected by adding "Alin Theodor Iacob, Sunnyvalue, CA (US)" as a coinventor.

Signed and Sealed this
Fourth Day of March, 2025

Coke Morgan Stewart
*Acting Director of the United States Patent and Trademark Office*